United States Patent
Dang Van et al.

(10) Patent No.: US 12,019,475 B2
(45) Date of Patent: Jun. 25, 2024

(54) ELECTRONIC DEVICE COMPRISING HOUSING STRUCTURE

(71) Applicant: Samsung Electronics Co., Ltd., Suwon-si (KR)

(72) Inventors: Nghia Dang Van, Bac Ninh Province (VN); Truong Dao Xuan, Bac Ninh Province (VN)

(73) Assignee: Samsung Electronics Co., Ltd., Suwon-si (KR)

(*) Notice: Subject to any disclaimer, the term of this patent is extended or adjusted under 35 U.S.C. 154(b) by 221 days.

(21) Appl. No.: 17/648,142

(22) Filed: Jan. 17, 2022

(65) Prior Publication Data
US 2022/0137666 A1    May 5, 2022

Related U.S. Application Data

(63) Continuation of application No. PCT/KR2019/009703, filed on Aug. 5, 2019.

(51) Int. Cl.
*G06F 1/16*      (2006.01)
*H04M 1/02*    (2006.01)

(52) U.S. Cl.
CPC .......... *G06F 1/1626* (2013.01); *G06F 1/1688* (2013.01); *H04M 1/0249* (2013.01)

(58) Field of Classification Search
CPC ........ G06F 1/16; G06F 1/1626; G06F 1/1688; G06F 1/1628; H04M 1/02; H04M 1/0249; H04M 1/035
USPC ...................................................... 361/679.3
See application file for complete search history.

(56) References Cited

U.S. PATENT DOCUMENTS

| 9,363,589 B2 | 6/2016 | Lippert et al. |
| 10,701,469 B2 | 6/2020 | Park et al. |
| 2011/0170728 A1* | 7/2011 | Chen ...................... H04R 1/021 381/365 |

(Continued)

FOREIGN PATENT DOCUMENTS

| KR | 20150082043 A | 7/2015 |
| KR | 10-1771456 B1 | 8/2017 |

(Continued)

OTHER PUBLICATIONS

European Patent Office, "Supplementary European Search Report," issued Jun. 10, 2022, in connection with European Patent Application No. 19940338.7, 13 pages.

(Continued)

*Primary Examiner* — Danny Nguyen

(57) ABSTRACT

An electronic device according to an embodiment includes a housing, a rear case coupled to the housing, a sealing member arranged between the housing and the rear case, a first acoustic path extending in a single direction and including an end portion arranged between the housing and the rear case, and a first sealing member arranged between the housing and the rear case and including a first sealing area having a first sealing surfaces in contact with the housing and a second sealing surface in contact with the rear case and a second sealing area having a surface in contact with one of the housing and the rear case, wherein the second sealing area is arranged at the end portion of the first acoustic path and may include an inclined portion oriented at the end portion of the first acoustic path.

19 Claims, 22 Drawing Sheets

(56) References Cited

U.S. PATENT DOCUMENTS

2014/0339012 A1    11/2014  Richardson et al.
2017/0251564 A1*    8/2017  Jun ...................... H05K 5/069
2018/0103307 A1     4/2018  Hansson
2019/0072903 A1     3/2019  Park et al.
2019/0222921 A1     7/2019  Lee et al.

FOREIGN PATENT DOCUMENTS

KR       20180022195 A    3/2018
KR    10-2018-0051983 A    5/2018
KR       20190026461 A    3/2019

OTHER PUBLICATIONS

Translation of the Written Opinion of the International Searching Authority in connection with International Application No. PCT/KR2019/009703 issued May 4, 2020, 6 pages.
International Search Report and Written Opinion of the International Searching Authority in connection with International Application No. PCT/KR2019/009703 issued May 4, 2020, 9 pages.
Office Action dated Mar. 5, 2024, in connection with European Patent Application No. 19940338.7, 11 pages.
Office Action issued Mar. 8, 2024, in connection with Korean Patent Application No. 10-2021-7032013, 8 pages.

* cited by examiner

ELECTRONIC DEVICE COMPRISING HOUSING STRUCTURE

CROSS-REFERENCE TO RELATED APPLICATION

This application is a continuation of International Application No. PCT/KR2019/009703, filed Aug. 5, 2019, the disclosures of which are herein incorporated by reference in its entirety.

BACKGROUND

1. Field

Disclosed is an electronic device including a housing structure.

2. Description of Related Art

In an electronic device such as a smartphone, a tablet personal computer (PC), or a wearable device, at least one acoustic component may be mounted on a main body housing. The mounted acoustic component may be connected to the outside of the main body housing by using an acoustic passage.

Also, the mounted acoustic component may include a waterproof structure to prevent foreign substances from entering an acoustic generator. The waterproof structure is a structure for preventing penetration of moisture even under a specific atmospheric pressure, and may be formed in the acoustic component.

A sealing structure may be provided to protect the acoustic component arranged inside the main body housing from external foreign substances. To this end, a sealing member is interposed between a housing constituting the main body housing and a rear case, and the acoustic component may be sealed from the outside by applying a certain pressure and compressing the housing and the rear case.

The sealing member interposed between the housing and the rear case to seal the acoustic component from the outside may affect acoustic performance due to it blocking the acoustic passage.

SUMMARY

According to an embodiment, there is provided an electronic device including a sealing member sealing an acoustic component from the outside and arranged at a specific position between a housing and a rear case without affecting acoustic performance.

An electronic device according to an embodiment includes a housing, a rear case coupled to the housing, a sealing member arranged between the housing and the rear case, a first acoustic path extending in a single direction and including an end portion arranged between the housing and the rear case, and a first sealing member arranged between the housing and the rear case and including a first sealing area having a first sealing surface in contact with the housing and a second sealing surface in contact with the rear case and a second sealing area having a surface in contact with one of the housing and the rear case, wherein the second sealing area is arranged at the end portion of the first acoustic path and may include an inclined portion oriented at the end portion of the first acoustic path.

A second sealing member arranged between the housing and the rear case and having a first sealing surface in contact with the housing and a second sealing surface in contact with the rear case may be further included, and the first sealing member and the second sealing member may be arranged at different heights in a thickness direction of the electronic device.

The second sealing member and the first sealing member may be sequentially arranged in a direction in which the housing moves to couple to the rear case.

The first sealing member and the second sealing member may each include a flexible material.

A thickness of an overlapping area in which the first sealing area is in contact with one of the housing and the rear case may be less than or equal to a distance between a lower end portion of the first acoustic path and an upper end portion of the overlapping area.

A second acoustic path extending in a single direction and including an end portion arranged between the housing and the rear case may be further included, and the first acoustic path may be arranged at a different height than the second acoustic path in a thickness direction of the electronic device.

An acoustic chamber connecting the end portion of the second acoustic path to the end portion of the first acoustic path may be further included.

A width of the acoustic chamber in the direction in which the first acoustic path extends may be 25% or less than a diameter of the first acoustic path.

A connecting portion arranged to connect the first sealing member to the second sealing member may be further included.

The connecting portion may include a first connection area in which the first sealing area is connected to the second sealing member and a second connection area in which the second sealing area is connected to the second sealing member are connected.

The second sealing area and the second connection area may each include an arcuate shape oriented at the first acoustic path.

The connecting portion may include a first connection area having a first surface in contact with the housing and a second surface in contact with the rear case, and the second sealing area may protrude from the first sealing area and the first connection area in the thickness direction of the electronic device.

The second sealing area may include a quadrangular shaped cross-section in the thickness direction of the electronic device.

The second sealing area may include a triangular shaped cross-section in the thickness direction of the electronic device.

A first sealing member mounting groove arranged in one of the housing and the rear case may be further included, and the first sealing member may include a first sealing member mounting portion inserted into the first sealing member mounting groove.

The first sealing member mounting groove may be arranged at a lower portion of the inclined portion.

A connecting portion mounting groove arranged in one of the housing and the rear case may be further included, and the connecting portion may include a connecting portion mounting portion inserted into the connecting portion mounting groove.

The electronic device may further include a display panel that displays a screen, a first transparent member arranged in front of the housing, and a second transparent member arranged at the rear of the rear case.

An electronic device according to an embodiment may include a sealing member sealing an acoustic component from the outside and arranged at a specific position between a housing and a rear case without affecting acoustic performance.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
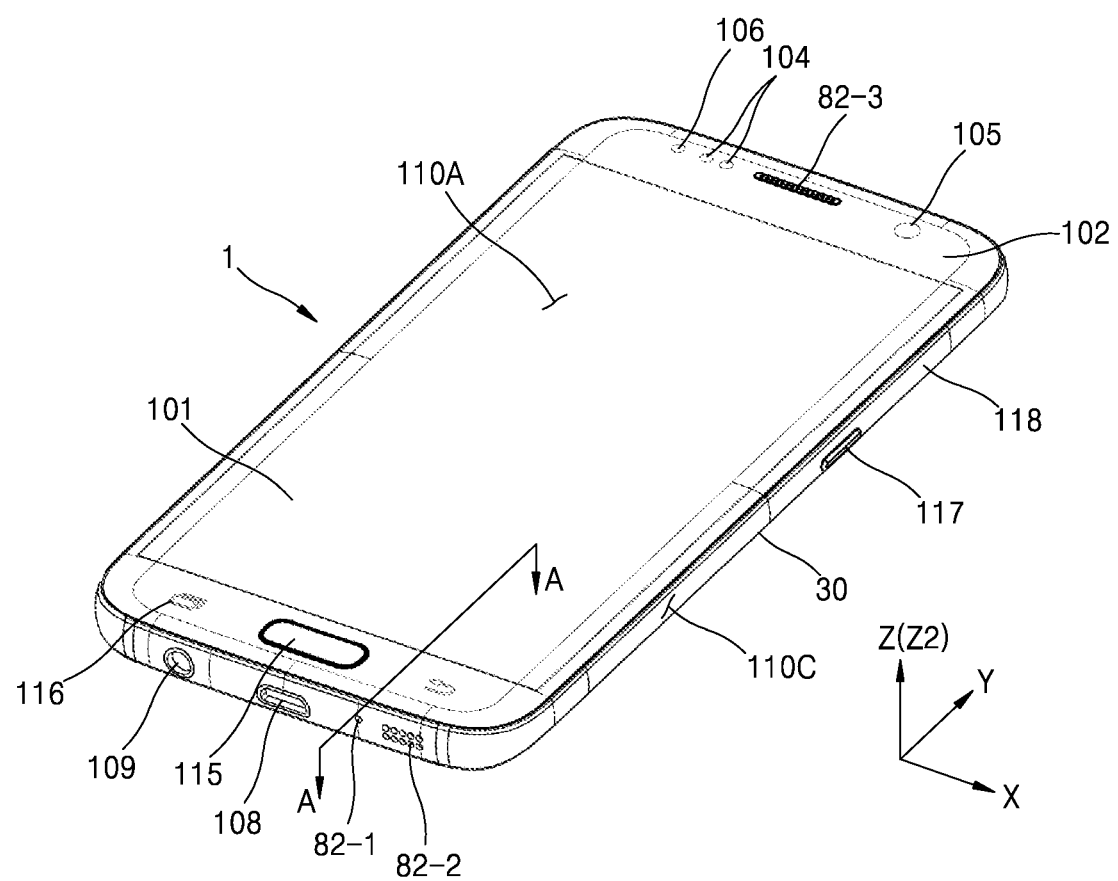
FIG. 1A is a perspective view of a front surface of a mobile electronic device according to an embodiment.

FIGS. 1A through 12C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the configuration and operation of the disclosure will be described in detail through the embodiments of the accompanying drawings.

Terms used in the specification will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

It will be understood that when a certain part "includes" a certain component, the part does not exclude another component but can further include another component, unless the context clearly dictates otherwise.

In addition, terms such as "first, second" do not limit the meaning, but are used for the purpose of distinguishing one component from other components.

Hereinafter, embodiments of the disclosure will be described in detail with reference to the accompanying drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, like reference numerals denote like elements.

An electronic device according to various embodiments of the disclosure may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a MP3 player, a mobile medical device, a camera, or a wearable device (e.g., smart glasses, a head-mounted-device (HMD), electronic apparel, an electronic bracelet, an electronic necklace, an electronic appcessory, an electronic tattoo, a smart mirror, or a smart watch).

In some embodiments, an electronic device may be a smart home appliance. The smart home appliance may include, for example, at least one of a television (TV), a DVD player, an audio, a refrigerator, an air conditioner, a vacuum cleaner, an oven, a microwave, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, or an electronic picture frame.

In another embodiment, an electronic device may include at least one of various medical devices (e.g., various portable medical measuring devices (glucose monitors, heart rate monitors, blood pressure measuring devices, or temperature measuring devices), magnetic resonance angiography (MRA), magnetic resonance imaging (MRI), computed tomography (CT), cameras, or ultrasonic devices), a navigation device, a global positioning system (GPS) receiver, an event data recorders (EDR), a flight data recorder (FDR), a vehicle infotainment device, electronic equipment for ships (e.g., a navigation system for ships, gyrocompass, etc.), avionics, a security device, a head unit for vehicles, an industrial or household robot, an automatic teller's machine (ATM) of financial institutions, a point of sales (POS) of stores, or internet of things (e.g., light bulbs, various sensors, electric or gas meters, sprinkler devices, fire alarms, thermostats, street lights, toasters, exercise equipment, hot water tanks, heaters, boilers, etc.).

According to some embodiments, an electronic device may include at least one of part of furniture or building/structure, an electronic board, an electronic signature receiving device, a projector, or various measuring devices (e.g., water, electricity, gas, or a radio wave measuring device). In various embodiments, an electronic device may be a combination of one or more of various apparatuses described above. An electronic device according to some embodiments may be a flexible electronic device. Also, an electronic device according to an embodiment of the disclosure is not limited to devices described above, and may include a new electronic device according to technological development.

Hereinafter, an electronic device according to various embodiments is described with reference to the accompanying drawings. In this document, the term user may refer to a person who uses an electronic device or an apparatus (e.g., an artificial intelligence electronic device) using an electronic device.

Figure 1B:
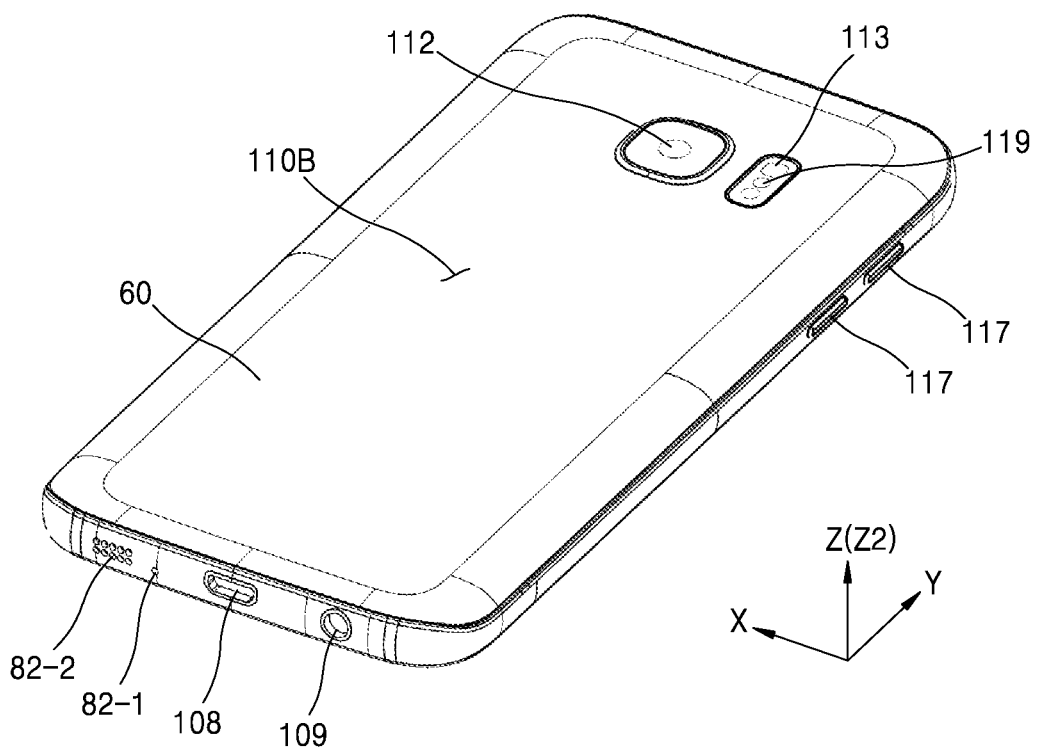
FIG. 1B is a perspective view of a rear surface of the electronic device of FIG. 1A.
Figure 2:
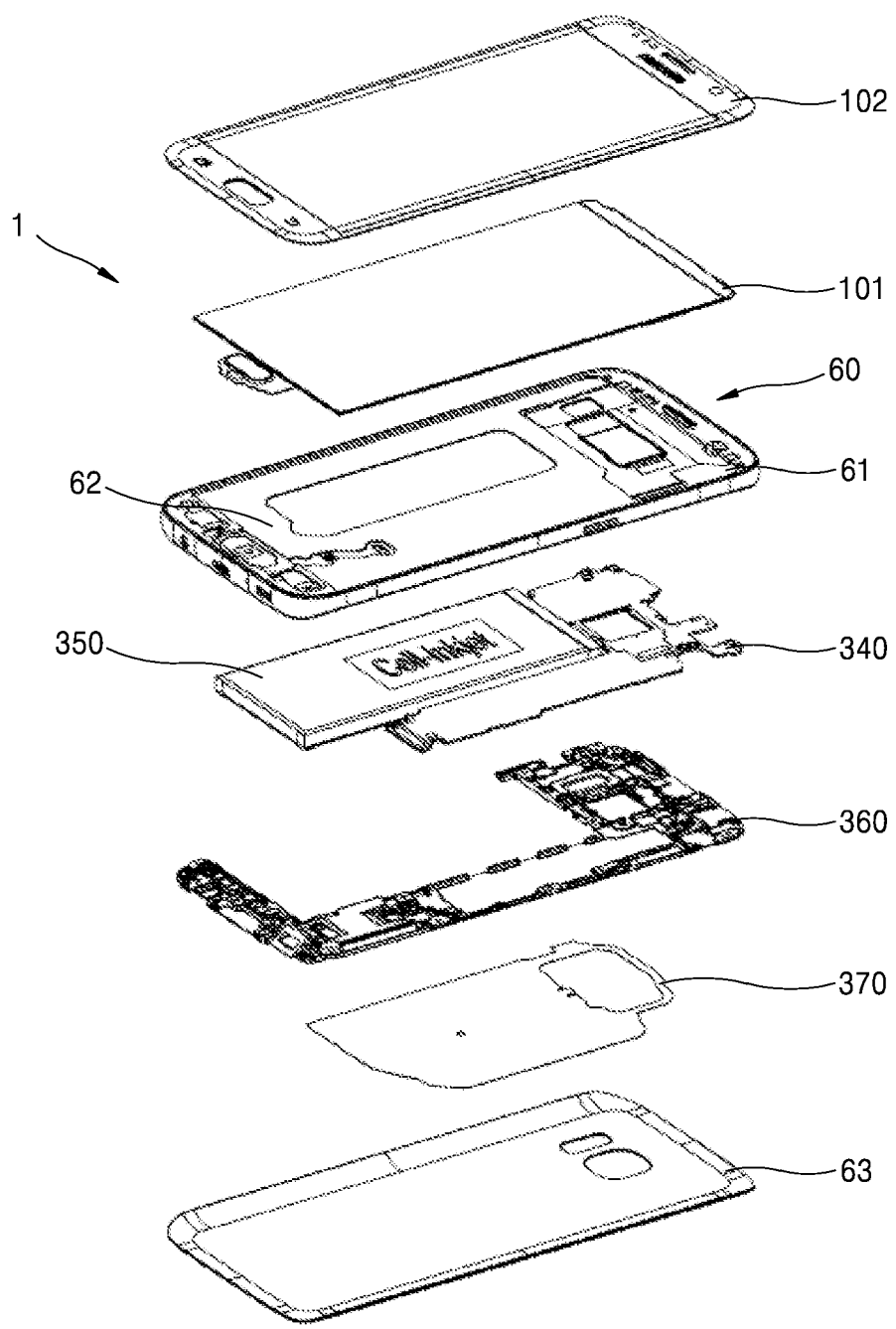
FIG. 2 is an exploded perspective view of the electronic device of FIG. 1A.
Figure 3:
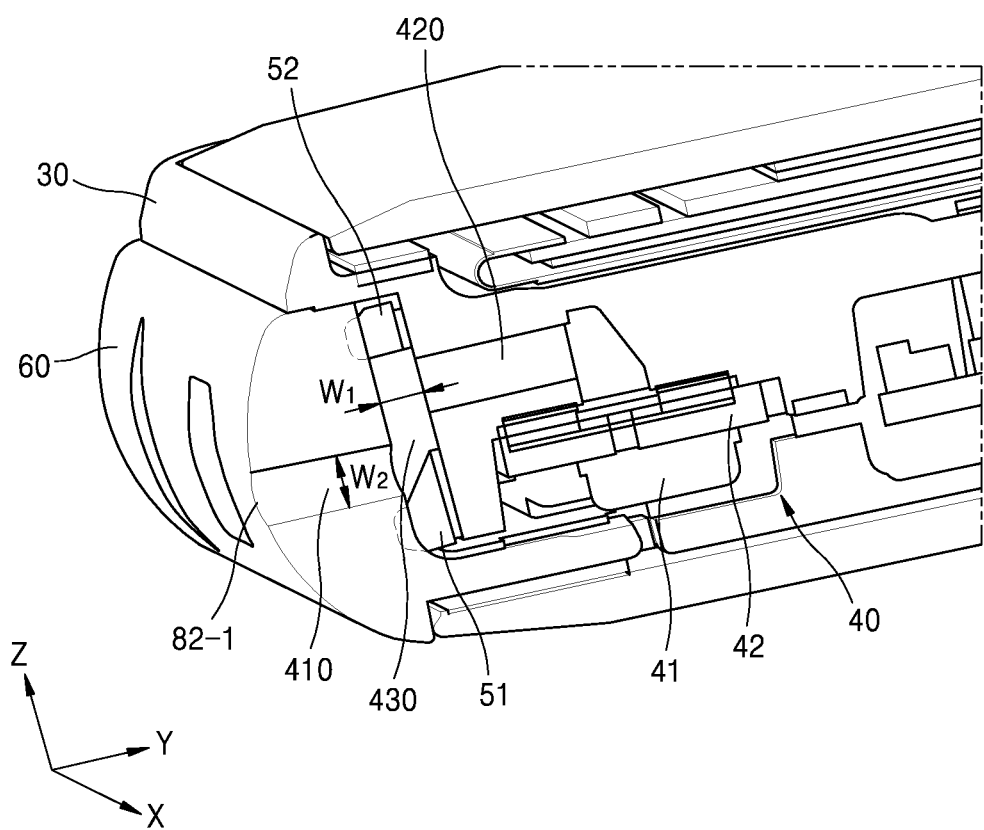
FIG. 3 is a cross-sectional view of the electronic device of FIG. 1A, which is taken along a line A-A.
Figure 4:
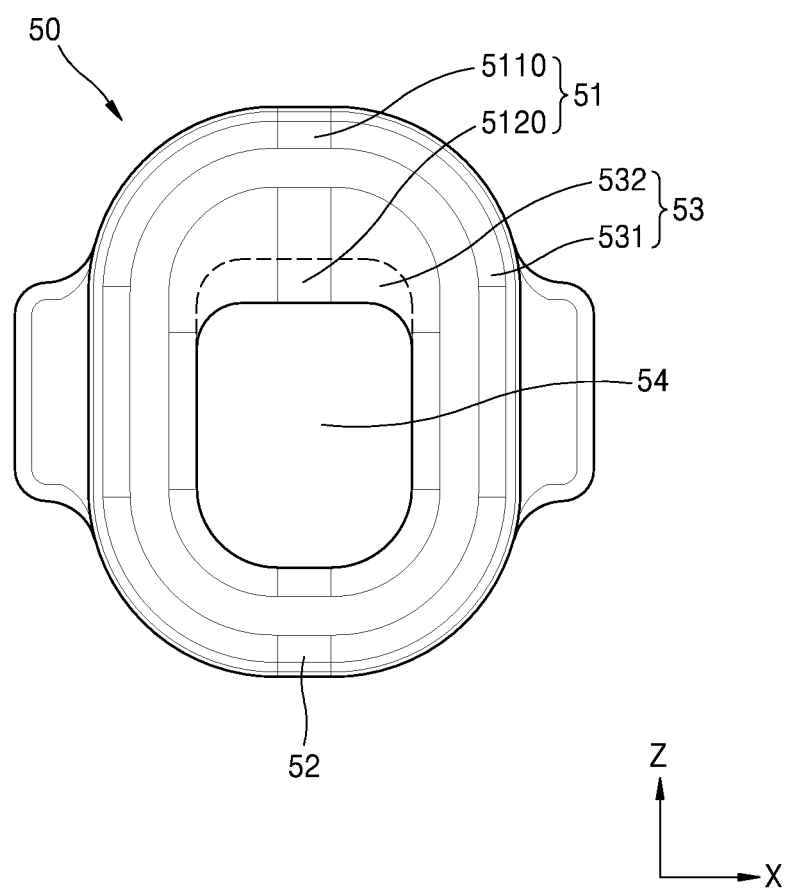
FIG. 4 is a perspective view of a sealing portion according to an embodiment.

FIG. 1A is a perspective view of a front surface of a mobile electronic device according to an embodiment. FIG. 1B is a perspective view of a rear surface of the electronic device of FIG. 1A. FIG. 2 is an exploded perspective view of the electronic device of FIG. 1A. FIG. 3 is a cross-sectional view of the electronic device of FIG. 1A, which is taken along A-A. FIG. 4 is a perspective view of a sealing portion according to an embodiment.

Referring to FIGS. 1A and 1B, an electronic device 1 according to an embodiment may include a housing 30 including a first surface (or front surface) 110A, a second surface (or rear surface) 110B, and a side surface 110C surrounding space between the first surface 110A and the second surface 110B.

Here, the front surface 110A of the electronic device 1 is defined as a surface that a user see when using the electronic device 1 normally, and the rear surface 110B of the electronic device 1 is defined as a surface opposite to the front surface 110A thereof. Also, a front Z1 is defined as a direction toward a user when the user normally uses the electronic device 1, and a rear Z2 is defined as a direction opposite to the front Z1.

In another embodiment (not shown), a housing may refer to a structure forming part of the first surface 110A, the second surface 110B, and the side surface 110C of FIG. 1A and FIG. 1B. According to an embodiment, the first surface 110A may be formed by a front surface plate 102 (e.g., a glass plate including various coating layers, or a polymer plate) of which at least a portion is substantially transparent. The second surface 110B may be formed by a rear case 60 that is substantially opaque. The rear case 60 may be formed by, for example, coated or tinted glass, ceramic, polymer, metal (e.g., aluminum, stainless steel (STS), or magnesium), or a combination of at least two of the materials. The side surface 110C is coupled to the front surface plate 102 and the rear case 60, and may be formed by a side surface bezel structure 118 (or "side surface member") including a metal and/or polymer. In some embodiments, the rear case 60 and the side surface bezel structure 118 are integrally formed and may include the same material (e.g., a metal material such as aluminum).

According to an embodiment, the electronic device 1 may include at least one of a display 101, audio modules 82-1, 82-2, and 82-3, sensor modules 104 and 119, camera modules 105, 112, and 113, key input apparatuses 115, 116, and 117, an indicator 106, and connector holes 108 and 109. In some embodiments, the electronic device 1 may omit at least one of components (e.g., the key input apparatuses 115, 116, and 117, or the indicator 106), or may additionally include another component.

The display 101 may be exposed through, for example, a significant portion of the front surface plate 102. The display 101 may be coupled to or arranged adjacent to a touch sensing circuit, a pressure sensor capable of measuring touch strength (pressure), and/or a digitizer that detects a stylus pen of a magnetic field type.

The display 101 may have a shape of which length in a vertical direction (y direction) is greater than a length in a horizontal direction (x direction). However, the shape of the display 101 is not limited thereto, and may be modified in various shapes.

The audio modules 82-1, 82-2, and 82-3 may include a microphone hole 82-1 and speaker holes 82-2 and 82-3. In the microphone hole 82-1, a microphone for obtaining external sound may be arranged therein, and in some embodiments, a plurality of microphones may be arranged to detect a direction of sound. The speaker holes 82-2 and 82-3 may include an external speaker hole 82-2 and a call receiver hole 82-3. In some embodiments, the speaker holes 82-2 and 82-3 and the microphone hole 82-1 are implemented as a single hole, or a speaker may be included without the speaker holes 82-2 and 82-3 (e.g., a piezo speaker).

The sensor modules 104 and 119 may generate an electrical signal or a data value, which corresponds to an internal operating state of the electronic device 1 or an external environment state. The sensor modules 104 and 119 may include, for example, a first sensor module 104 (e.g., a proximity sensor) and/or a second sensor module (e.g., a fingerprint sensor) arranged on the first surface 110A of the housing 30, and/or a third sensor module 119 (e.g., an HRM sensor) arranged on the second surface 110B of the housing 30. The fingerprint sensor may be arranged on the second surface 110B as well as on the first surface 110A (e.g., a home key button 115) of the housing 30. The electronic device 1 may further include at least one sensor module , for example, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112, and 113 may include a first camera apparatus 105 arranged on the first surface 110A of the electronic device 1, a second camera apparatus 112 arranged on the second surface 110B, and/or a flash 113. The camera apparatuses 105 and 112 may include one or more lenses, an image sensor, and/or an image signal processor. The flash 113 may include, for example, a light-emitting diode or a xenon lamp. In some embodiments, two or more lenses (an infrared camera, wide-angle and telephoto lenses) and image sensors may be arranged on one surface of the electronic device 1.

The key input apparatuses 115, 116, and 117 may include the home key button 115 arranged on the first surface 110A of the housing 30, a touch pad 116 arranged around the home key button 115, and/or a side key button 117 arranged on the side surface 110C of the housing 30. In another embodiment, the electronic device 1 may not include some or all of the key input apparatuses 115, 116, and 117, and the key input apparatuses 115, 116, and 117 that are not included may be implemented in other forms such as soft keys on the display 101.

The indicator 106 may be arranged, for example, on the first surface 110A of the housing 30. The indicator 106 may provide, for example, status information of the electronic device 1 in the form of light, and may include an LED.

The connector holes 108 and 109 may include a first connector hole 108 capable of accommodating a connector (e.g., a USB connector) for transmitting and receiving power and/or data to and from an external electronic device, and/or a second connector hole 109 (e.g., an earphone jack) capable of accommodating a connector for transmitting and receiving an audio signal to and from an external electronic device.

Referring to FIG. 3, the electronic device 1 may include the display 101, the front surface plate 102, the rear case 60 including a side surface bezel structure 61 and a first support 62 (e.g., a bracket), a printed circuit board 340, a battery 350, a second support 360, an antenna 370, and a rear surface plate 63. In some embodiments, the electronic device 1 may omit at least one of components (e.g., the first support 62 or the second support 360), or may additionally include another component. At least one of components of the electronic device 1 may be the same as or similar to at least one of components of the electronic device 1 of FIG. 1A or 1B, and duplicate description is omitted hereinafter.

The first support 62 may be arranged inside the electronic device 1 and connected to the side surface bezel structure 61, or may be integrally formed with the side surface bezel structure 61. The first support 62 may include, for example, a metal material and/or a non-metal (e.g., polymer) material. The first support 62 may include a first surface coupled to the display 101 and a second surface coupled to the printed circuit board 340. A processor, a memory, and/or an interface may be mounted onto the printed circuit board 340. The processor may include, for example, at least one of a central processing unit, an application processor, a graphics processing unit, an image signal processor, a sensor hub processor, or a communication processor.

The memory may include, for example, a volatile memory or a non-volatile memory.

The interface may include, for example, a high definition multimedia interface (HDMI), an universal serial bus (USB) interface, an SD card interface, and/or an audio interface. The interface may, for example, electrically or physically connect the electronic device 1 to an external electronic device, and may include an USB connector, an SD card/MMC connector, or an audio connector.

The battery 350 is an apparatus for supplying power to at least one component of the electronic device 1, and may include, for example, a non-rechargeable primary cell, a rechargeable secondary cell, or a fuel cell. At least a portion of the battery 350 may be, for example, substantially coplanar with the printed circuit board 340. The battery 350 may be integrally arranged inside the electronic device 1, or may be arranged detachably from the electronic device 1.

The antenna 370 may be arranged between the rear surface plate 63 and the battery 350. The antenna 370 may include, for example, a near field communication (NFC) antenna, a wireless charging antenna, and/or a magnetic secure transmission (MST) antenna. The antenna 370 may, for example, perform near field communication with an external apparatus or wirelessly receive and transmit power required for charging. In another embodiment, an antenna structure may be formed by part of a side surface bezel structure 61 and/or a support 311 or a combination thereof.

Referring to FIGS. 2 to 4, the housing 30 according to an embodiment is an accommodating portion capable of accommodating an electronic device included in the electronic device 1, and is arranged along an edge of the electronic device 1. For example, the housing 30 defines at least a portion of a thickness of the electronic device 1 along the edge of the electronic device 1, and may be formed in a closed loop shape.

The rear case 60 is arranged at the rear of the housing 30, and may be coupled to the housing 30 to protect various components arranged therein. For example, the rear case 60 may be coupled to the housing 30 to form a side surface appearance of the electronic device 1. For example, the microphone hole 82-1, the speaker holes 82-2 and 82-3, and connector holes 88-1 and 88-2 may be arranged on a side surface of the electronic device 1 formed by the housing 30 and the rear case 60. For example, as shown in FIG. 3, the microphone hole 82-1, the speaker holes 82-2 and 82-3, and the connector holes 88-1 and 88-2 may be arranged on a lower side surface portion of the rear case 60.

An acoustic unit 40 may include an acoustic device 41 and a substrate 42 connected to the acoustic device 41. For example, the acoustic device 41 may be a microphone, and the substrate 42 may be provided as a printed circuit board (PCB). For example, the acoustic device 41 may be arranged in an accommodating portion provided in one of the housing 30 or the rear case 60, and the substrate 42 may be supported by at least one of the housing 30 or the rear case 60 so as to be connected to the acoustic device 41. For example, when the acoustic device 41 included in the acoustic unit 40 is a microphone, an acoustic path that may connect the acoustic device 41 to the microphone hole 82-1 may be formed between the acoustic device 41 and the microphone hole 82-1.

A first acoustic path 410 is an acoustic moving passage extending in a single direction, and may include an end portion arranged on an outer circumferential surface of the housing 30 or the rear case 60 and another end portion arranged between the housing 30 and the rear case 60. For example, the microphone hole 82-1 may be formed on the outer circumferential surface of the housing 30 or the rear case 60, on which the end portion of the first acoustic path 410 is arranged. For example, when the microphone hole 82-1 is arranged on a side portion of the rear case 60, the first acoustic path 410 may be arranged in the rear case 60 to extend from the microphone hole 82-1 in a single direction.

A second acoustic path 420 is an acoustic moving passage extending in a single direction, and may include an end portion arranged between the housing 30 and the rear case 60 and another end portion arranged to be connected to the acoustic device 41. For example, the second acoustic path 420 may be arranged in the housing 30 to extend in a single direction, and may be connected to the acoustic device 41 when the acoustic device 41 is arranged in the accommodating portion provided in the housing 30. When, as described above, the first acoustic path 410 and the second acoustic path 420 are respectively arranged in the rear case 60 and the housing 30, the second acoustic path 420 may be arranged at a position different from a position of the first acoustic path 410 in a thickness direction (Z direction) of the electronic device 1. However, the disclosure is not limited thereto, and the first acoustic path 410 and the second acoustic path 420 may be arranged at the same height in the thickness direction (Z direction) and connected to each other.

An acoustic chamber 430 is an acoustic space in which an end portion of the first acoustic path 410 may be connected to an end portion of the second acoustic path 420 to complement a misalignment state of the first acoustic path 410 and the second acoustic path 420 in the thickness direction (Z direction). For example, the acoustic chamber 430 may be defined by a hollow area 54 of a sealing portion 50 to be described below, the housing 30, and the rear case 60. Also, a width W1 of the acoustic chamber 430 in a direction (Y direction) may be less than a diameter W2 of the first acoustic path 410 in the thickness direction (Z direction) to improve acoustic characteristics. For example, the width W1 of the acoustic chamber 430 may be less than the diameter W2 of the first acoustic path 410 by 25% or less.

The sealing portion 50 may be arranged between the housing 30 and the rear case 60 to seal the acoustic unit 40 from the outside. For example, the sealing portion 50 may include a first sealing member 51, a second sealing member 52, and a connecting portion 53 connecting the first sealing member 51 and the second sealing member 52 to each other, which are sequentially arranged in the thickness direction (Z direction) of the electronic device 1. The first sealing member 51, the second sealing member 52, and the connecting portion 53 may be integrally formed. However, the disclosure is not limited thereto, and may be provided as separate components and then coupled to each other.

For example, the sealing portion 50 may be provided in a ring shape extending in the first sealing member 51, the second sealing member 52, and the connecting portion 53. In this case, the hollow area 54 formed by the first sealing member 51, the second sealing member 52, and the connecting portion 53 may define the acoustic chamber 430.

Also, the sealing portion 50 is between the housing 30 and the rear case 60 and may include a flexible material that may be easily modified. For example, the sealing portion 50 may include at least one of a rubber material, a silicon material, or a urethane material. However, the disclosure is not limited thereto, and may include an arbitrary material whose shape may be modified by receiving pressure between the housing 30 and the rear case 60.

Also, a shape and position of the sealing portion 50 may be modified by receiving pressure from the housing 30 or the rear case 60. The modified shape of the sealing portion 50 and the modified position of the sealing portion 50 may be determined by a magnitude and direction of the pressure applied from the housing 30 or the rear case 60. Hereinafter, when the housing 30 and the rear case 60 are coupled to each other in the thickness direction (Z direction) of the electronic device 1, pressure applied to the sealing portion 50 and a resultant change in the sealing portion 50 are described.

Figure 5A:
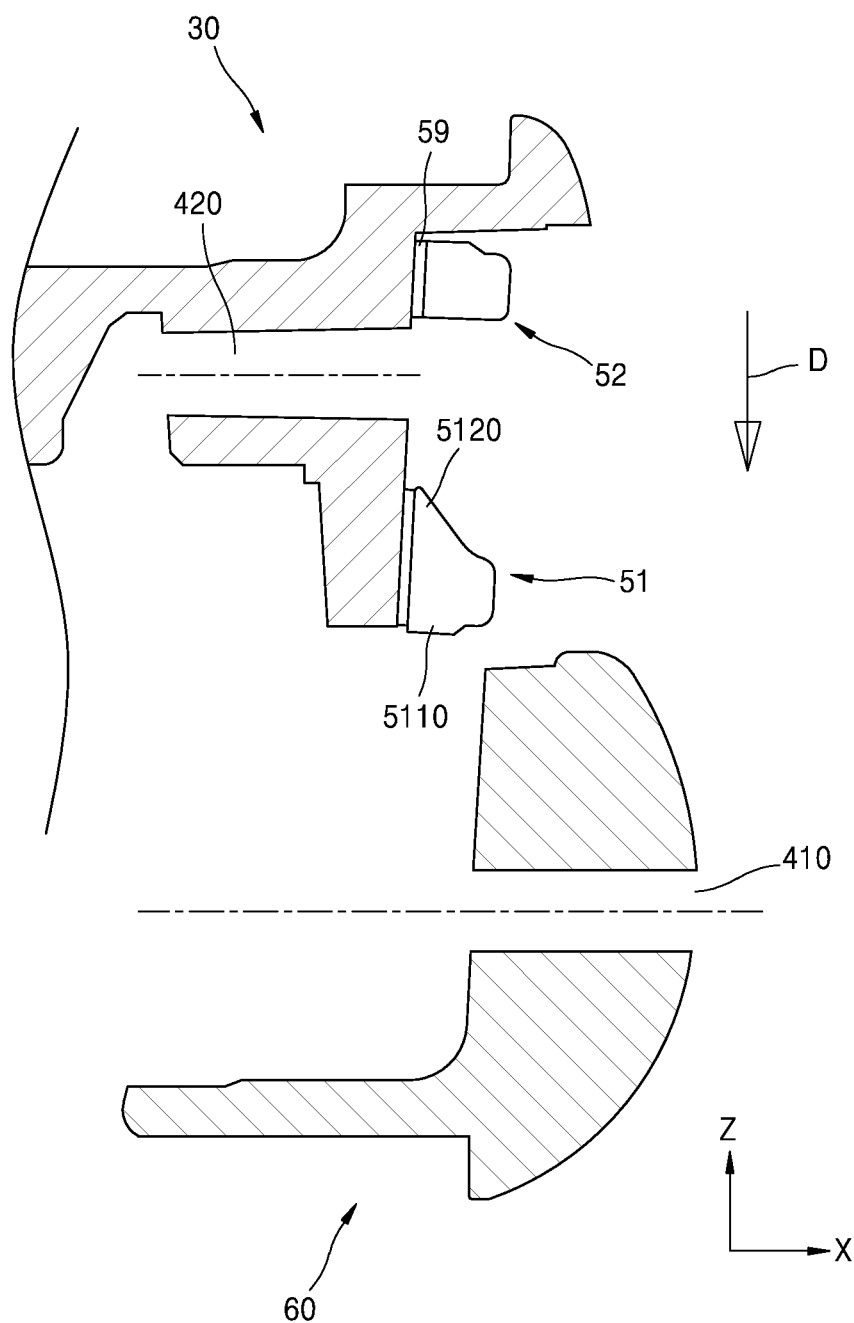
FIG. 5A is a cross-sectional view before a housing and a rear case are coupled, according to an embodiment.
Figure 5B:
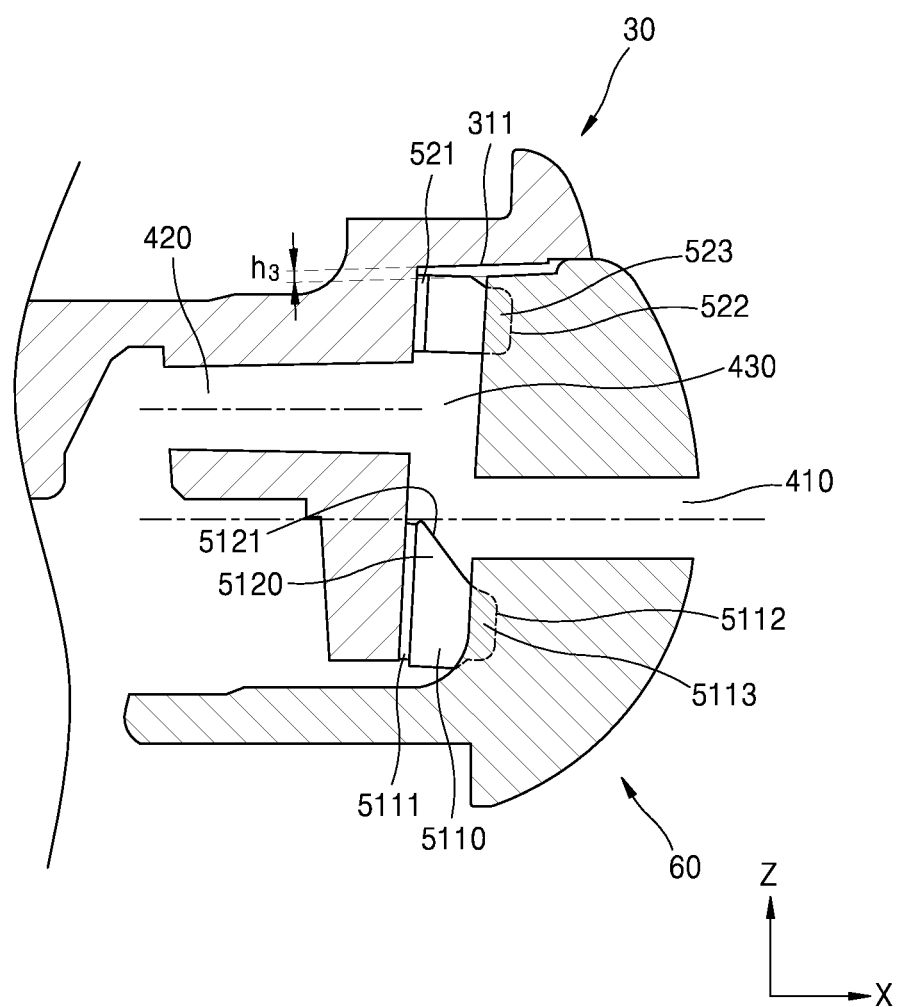
FIG. 5B is a cross-sectional view after a housing and a rear case are coupled, according to an embodiment.
Figure 6:
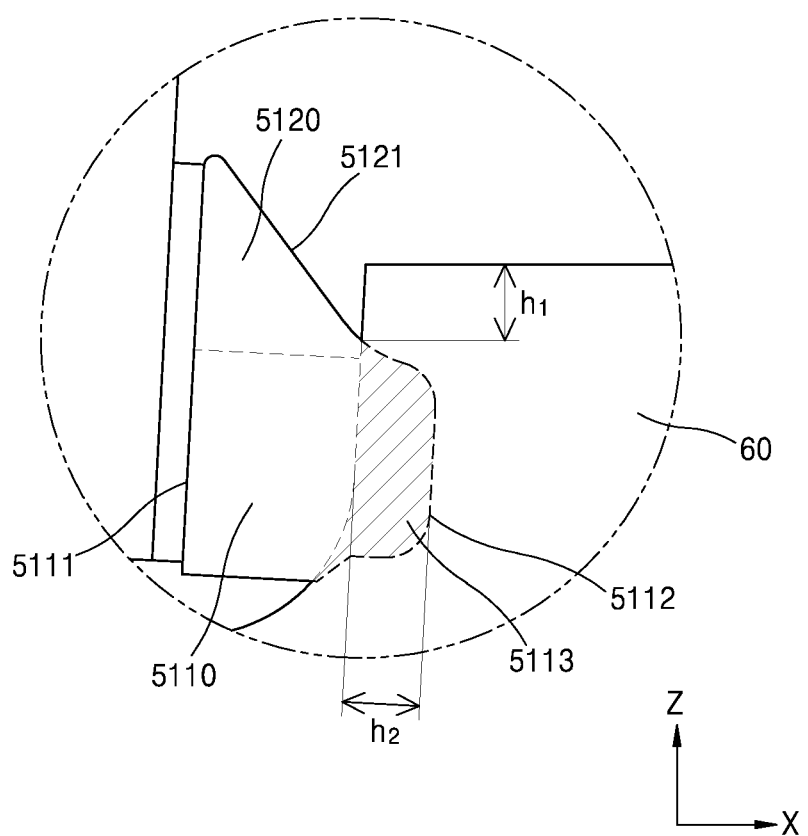
FIG. 6 is a partially enlarged view of a housing, a rear case, and a sealing portion, according to an embodiment.

FIG. 5A is a cross-sectional view before a housing and a rear case are coupled, according to an embodiment. FIG. 5B is a cross-sectional view after a housing and a rear case are coupled, according to an embodiment. FIG. 6 is a partially enlarged view of a housing, a rear case, and a sealing portion, according to an embodiment.

Referring to FIGS. 5A to 6, the housing 30 according to an embodiment may be coupled to the rear case 60 by moving in the thickness direction (Z direction). In this case, the sealing portion 50 may be attached to the housing 30 by using an adhesive tape 59, and the second sealing member 52 and the first sealing member 51 included in the sealing portion 50 may be sequentially arranged in a direction D in which the housing 30 and the rear case 60 are coupled to each other. That is, when the housing 30 is coupled to the rear case 60 by moving downward in the thickness direction (Z direction), the second sealing member 52 may be arranged above the first sealing member 51 in the thickness direction (Z direction).

The first sealing member 51 may include a first sealing area 5110 having a first sealing surface in contact with the housing 30 and and a second sealing surface in contact with the rear case 60 and a second sealing area 5120 having a surface in contact with one of the housing 30 and the rear case 60.

When the housing 30 and the rear case 60 are coupled to each other, the first sealing area 5110 is arranged between the housing 30 and the rear case 60 and may receive pressure from the housing 30 and the rear case 60. For example, the first sealing area 5110 may include a front surface 5111 and a rear surface 5112, each having a flat shape, and the front surface 5111 and the rear surface 5112 may be respectively in contact with the housing 30 and the rear case 60. In this case, pressure may be applied to the front surface 5111 and the rear surface 5112 respectively from the housing 30 and the rear case 60, and an overlapping area 5113 of the first sealing area 5110 may be modified to overlap the rear case 60. Also, in this case, in order to prevent the first acoustic path 410 from being blocked by the overlapping area 5113, a distance h1 between a lower end portion of the first acoustic path 410 and an upper end portion of the overlapping area 5113 may be greater than or equal to a thickness h2 of the overlapping area 5113.

When the housing 30 and the rear case 60 are coupled to each other, the second sealing area 5120 may be a support arranged at an end portion of the first acoustic path 410. For example, when the housing 30 and the rear case 60 are coupled to each other, the second sealing area 5120 may support the first sealing area 5110. For example, when the housing 30 moves in the thickness direction (Z direction) with respect to the rear case 60, the first sealing area 5110 may also move while in contact with a surface of the rear case 60. In this case, the first sealing area 5110 may receive power in a direction opposite to the direction D in which the housing 30 and the rear case 60 are coupled to each other by the surface of the rear case 60. Thus, a lower end portion of the first sealing area 5110 may be rolled between the housing 30 and the rear case 60. When the lower end portion of the first sealing area 5110 is rolled between the housing 30 and the rear case 60, the first sealing area 5110 may block at least a portion of the first acoustic path 410. In the disclosure, the second sealing area 5120 is arranged to prevent a phenomenon in which at least a portion of the first acoustic path 410 is blocked by the first sealing area 5110, and thus, the second sealing area 5120 may support the first sealing area 5110 to prevent a phenomenon in which the first sealing area 5110 is rolled.

The second sealing area 5120 may include an inclined portion 5121 arranged to face or oriented at an end portion of the first acoustic path 410. As described above, the second sealing area 5120 may protrude more in the thickness direction (Z direction) than the first sealing area 5110 in order to support the first sealing area 5110. In this case, the second sealing area 5120 may be arranged to face or oriented at an end portion of the first acoustic path 410 to block the first acoustic path 410. The second sealing area 5120 may include the inclined portion 5121 in order to prevent the first acoustic path 410 from being blocked by the second sealing area 5120. However, the disclosure is not limited thereto, and the second sealing area 5120 is of a shape protruding toward the first acoustic path 410, and may include a shape that does not block the first acoustic path 410.

The second sealing member 52 may be arranged in such a manner that a first surface of the second sealing member 52 is in contact with the housing 30 and and a second surface of the second sealing member 52 is in contact with the rear case 60. For example, when the housing 30 and the rear case 60 are coupled to each other, the second sealing member 52 is arranged between the housing 30 and the rear case 60 and may receive pressure from the housing 30 and the rear case 60. For example, the second sealing member 52 may include a front surface 521 and a rear surface 522, each having a flat shape, and the front surface 521 and the rear surface 522 may be respectively in contact with the housing 30 and the rear case 60. Thus, when the housing 30 and the rear case 60 are coupled to each other, pressure may be applied to the front surface 521 and the rear surface 522 respectively from the housing 30 and the rear case 60. In this case, a partial area 523 of the second sealing member 52 may be modified to overlap the rear case 60.

Because a support 311 by the housing 30 may be arranged in an upper area of the second sealing member 52, a separate support member for preventing a lower end portion of the second sealing member 52 from being rolled between the housing 30 and the rear case 60 may not be arranged. However, the disclosure is not limited thereto, and when the support 311 is not arranged in the upper area of the second sealing member 52, a separate support member for supporting the second sealing member 52 may be additionally arranged.

For example, a certain gap h3 may be arranged between the upper area of the second sealing member 52 and the support 311 in consideration of an assembly tolerance between the housing 30 and the rear case 60. When the certain gap h3 is arranged between the housing 30 and the rear case 60 in consideration of the assembly tolerance, in order to prevent the first acoustic path 410 from being blocked by the overlapping area 5113, the distance h1 between the lower end portion of the first acoustic path 410 and the upper end portion of the overlapping area 5113 may be greater than or equal to a distance obtained by the sum of the thickness h2 of the overlapping area 5113 and the gap h3.

Figure 7A:
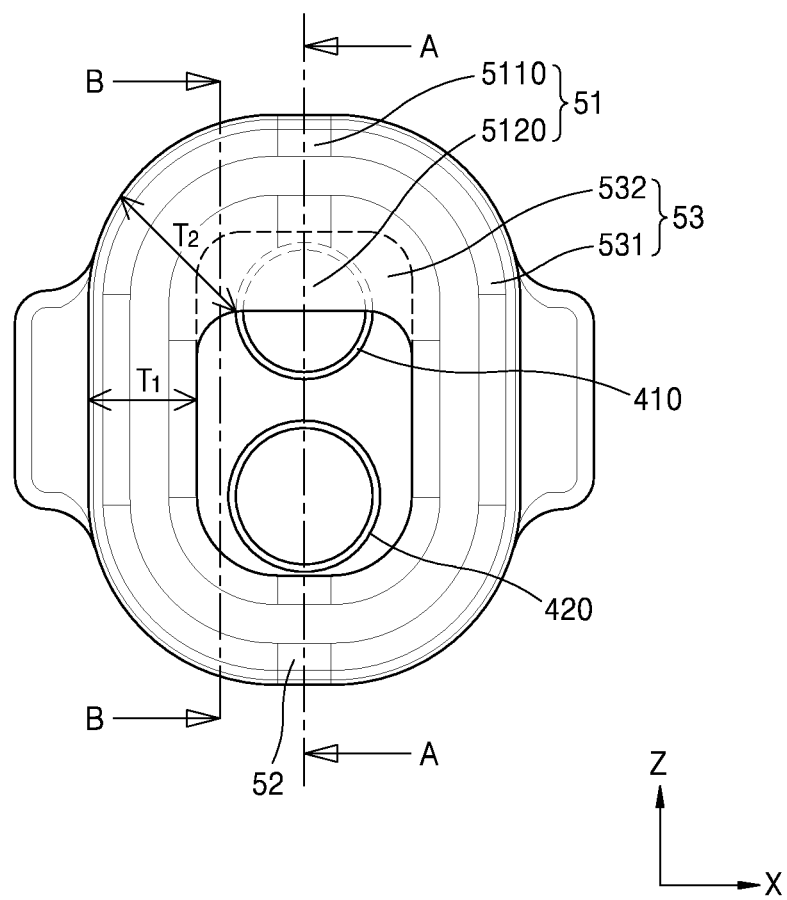
FIG. 7A is a plan view of a sealing portion, a first acoustic path, and a second acoustic path, according to an embodiment.
Figure 7B:
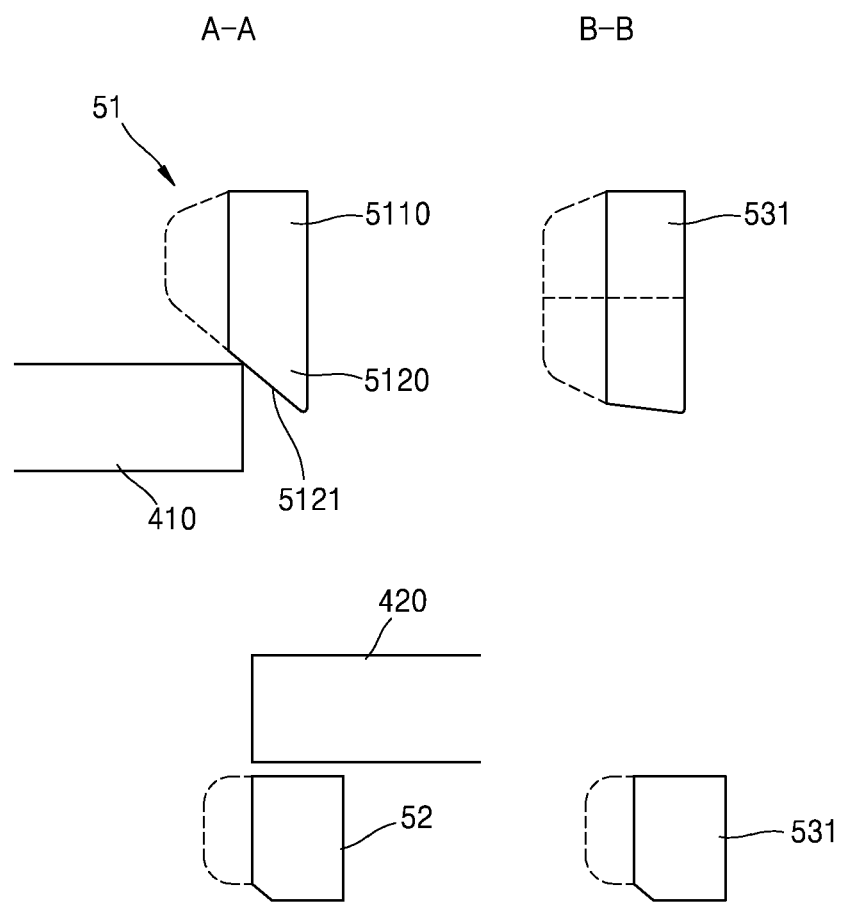
FIG. 7B is a cross-sectional view of the sealing portion shown in FIG. 7A, taken along lines A-A and B-B.

FIG. 7A is a plan view of a sealing portion, a first acoustic path, and a second acoustic path, according to an embodiment. FIG. 7B is a cross-sectional view of the sealing portion shown in FIG. 7A, taken along lines A-A and B-B.

Referring to FIGS. 7A and 7B, the sealing portion 50 according to an embodiment may include the first sealing member 51, the second sealing member 52, and the connecting portion 53 connecting the first sealing member 51 and the second sealing member 52 to each other.

The connecting portion 53 according to an embodiment may include a first connection area 531 in which the first sealing area 5110 and the second sealing member 52 included in the first sealing member 51 are connected to each other and a second connection area 532 in which the second sealing area 5120 and the second sealing member 52 included in the first sealing member 51 are connected to each other.

The first connection area 531 is formed to extend in a single direction, and may connect the first sealing area 5110 and the second sealing member 52 to each other. For example, the first connection area 531 is arranged in such a manner that both surfaces thereof are respectively in contact with the housing 30 and the rear case 60, and may perform sealing. For example, when the housing 30 and the rear case 60 are coupled to each other, the first connection area 531 is arranged between the housing 30 and the rear case 60 and compressed by receiving pressure from the housing 30 and the rear case 60. Thus, the first connection area 531 may perform a sealing function between the housing 30 and the rear case 60.

When the housing 30 and the rear case 60 are coupled to each other, the second connection area 532 may be a support capable of supporting the first sealing area 5110. For example, the second connection area 532 is arranged at both side portions of the second sealing area 5120 to support the first sealing area 5110 together with the second sealing area 5120.

As described above, as the second connection area 532 is added to the first connection area 531 connecting the first sealing area 5110 and the second sealing member 52 to each other, a width T2 of the sealing portion 50 including the second connection area 532 may be greater than a width T1 of the first connection area 531. As the second connection area 532 is added to the first connection area 531, bearing power for the first sealing area 5110 may be additionally secured, but the second connection area 532 may not be arranged according to bearing power required for the first sealing area 5110.

Figure 8A:
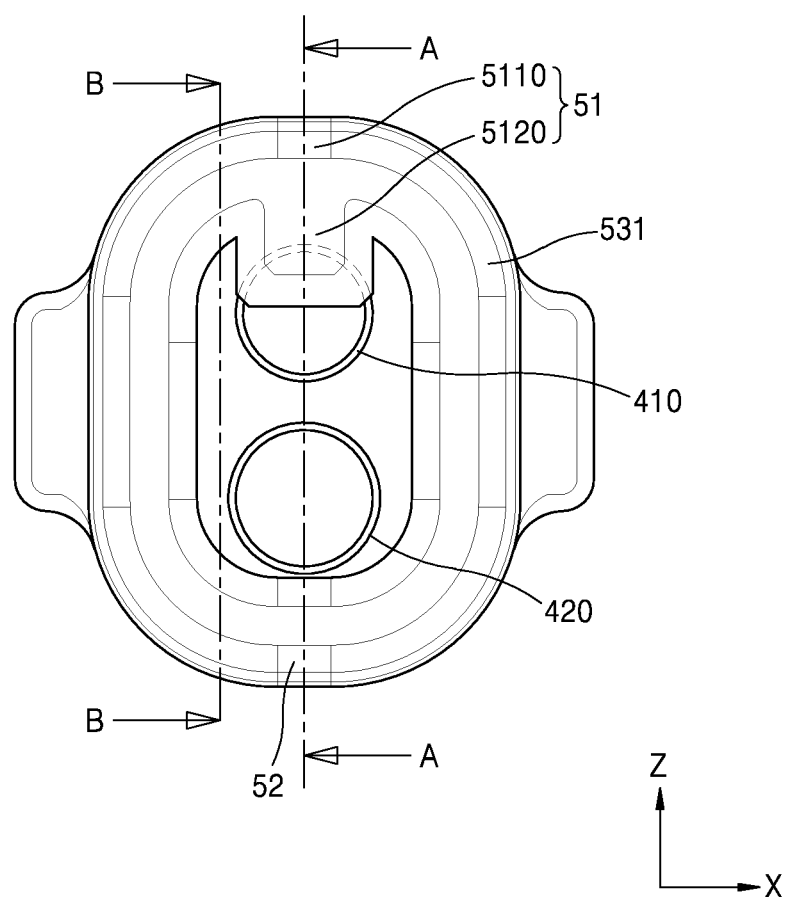
FIG. 8A is a plan view of a sealing portion, a first acoustic path, and a second acoustic path, according to an embodiment.
Figure 8B:
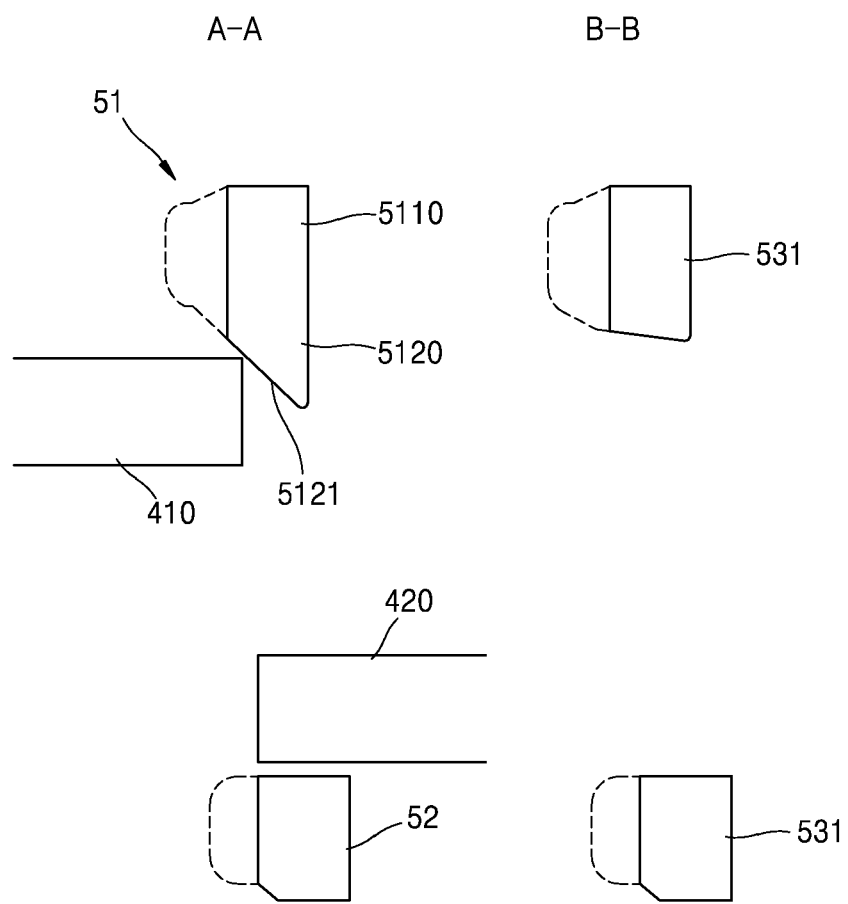
FIG. 8B is a cross-sectional view of the sealing portion shown in FIG. 8A, taken along lines A-A and B-B.
Figure 9A:
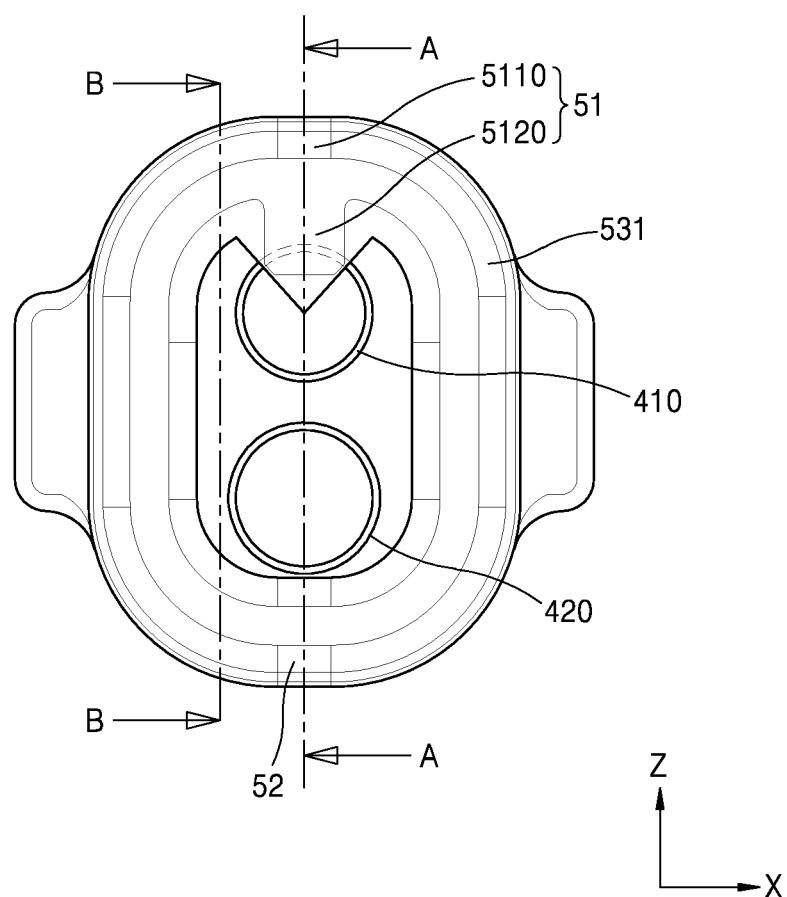
FIG. 9A is a plan view of a sealing portion, a first acoustic path, and a second acoustic path, according to an embodiment.
Figure 9B:
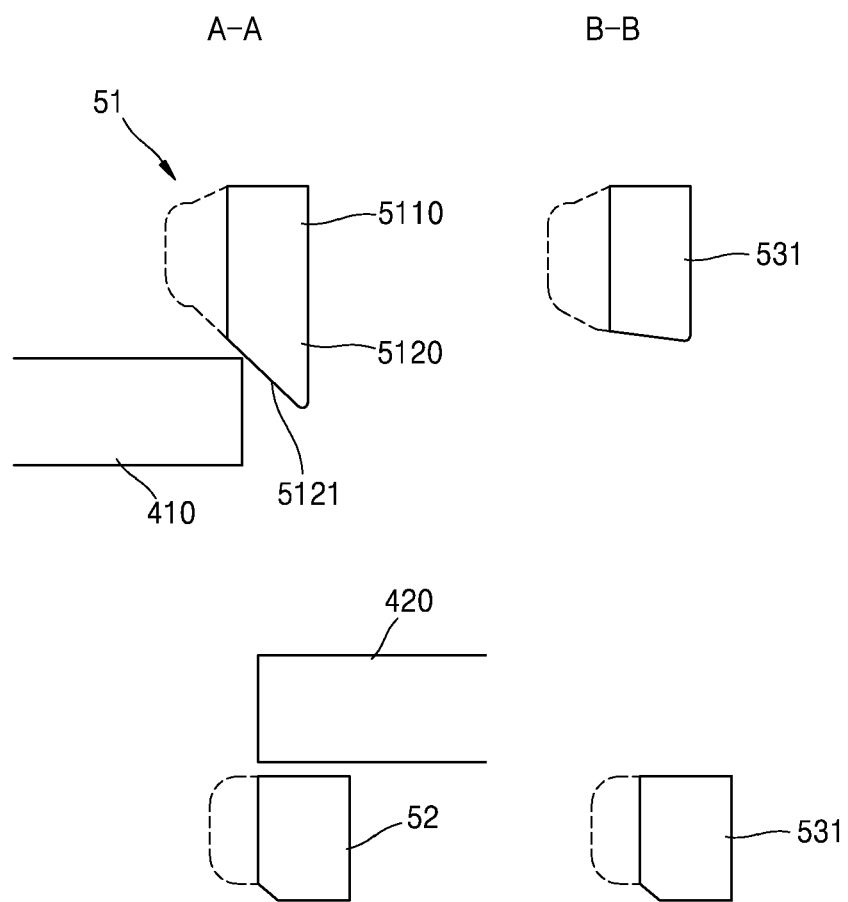
FIG. 9B is a cross-sectional view of the sealing portion shown in FIG. 9A, taken along lines A-A and B-B.

FIG. 8A is a plan view of a sealing portion, a first acoustic path, and a second acoustic path, according to an embodiment. FIG. 8B is a cross-sectional view of the sealing portion shown in FIG. 8A, taken along lines A-A and B-B. FIG. 9A is a plan view of a sealing portion, a first acoustic path, and a second acoustic path, according to an embodiment. FIG. 9B is a cross-sectional view of the sealing portion shown in FIG. 9A, taken along lines A-A and B-B.

Referring to FIGS. 8A and 8B, the connecting portion 53 according to an embodiment may include only the first connection area 531 having a first surface in contact with the housing 30 and and a second surface in contact with the rear case 60. Thus, a separate connection area may not be arranged at both side portions of the second sealing area 5120, and the first sealing area 5110 may be supported by the second sealing area 5120. Also, the second sealing area 5120 may include a quadrangular shaped cross-section in the thickness direction (Z direction) of the electronic device 1. Details related to the first connection area 531 are substantially the same as those described with reference to FIGS. 7A and 7B, and thus, descriptions thereof are omitted here.

Referring to FIGS. 9A and 9B, the connecting portion 53 according to an embodiment may include only the first connection area 531 having a first surface in contact with the housing 30 and a second surface in contact with the rear case 60. A shape of the second sealing area 5120 may also be modified according to bearing power required for the first sealing area 5110. For example, when bearing power required for the first sealing area 5110 is small, the second sealing area 5120 may include a triangular shaped cross-section in the thickness direction (Z direction) of the electronic device 1. In a case where the second sealing area 5120 includes the triangular shaped cross-section as described above, when the second sealing area 5120 extends in the thickness direction (Z direction) of the electronic device 1, the first acoustic path 410 may not be blocked. However, the disclosure is not limited thereto, and a shape of the second sealing area 5120 may be variously modified according to bearing power required for the first sealing area 5110.

Figure 10A:
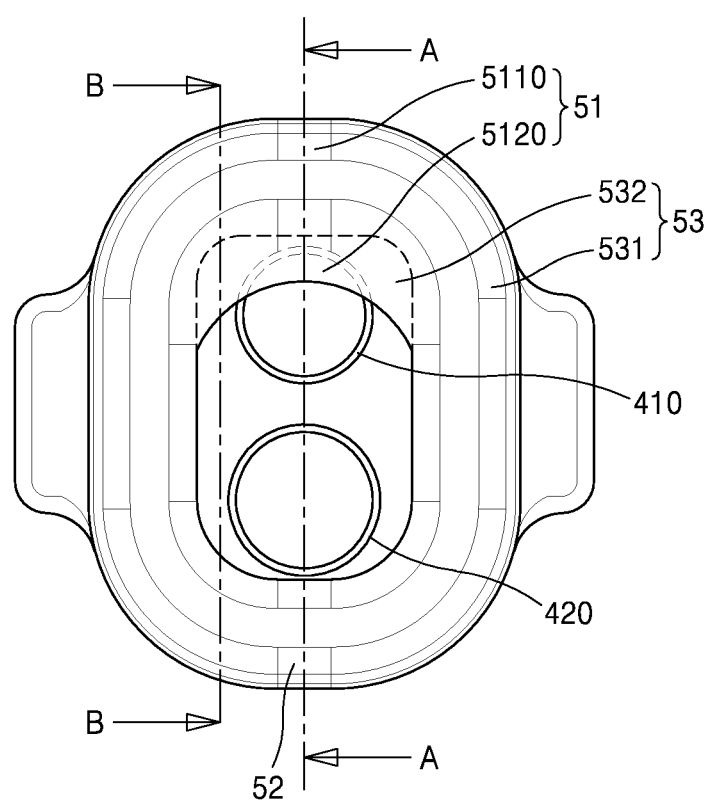
FIG. 10A is a plan view of a sealing portion, a first acoustic path, and a second acoustic path, according to an embodiment.
Figure 10B:
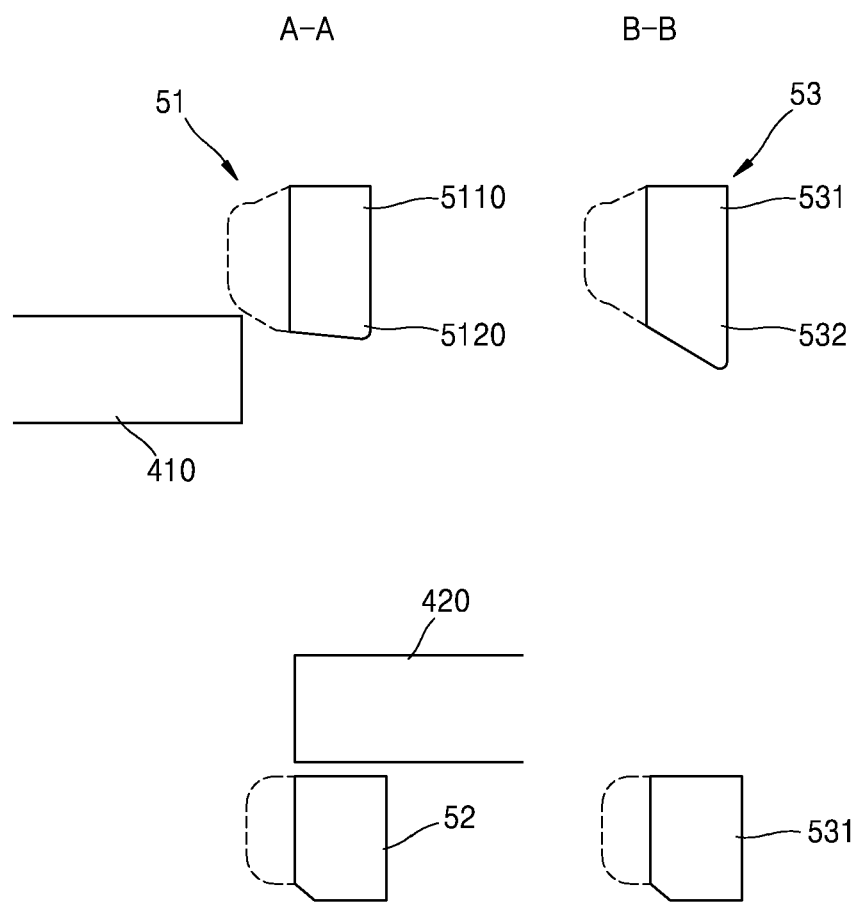
FIG. 10B is a cross-sectional view of the sealing portion shown in FIG. 10A, taken along lines A-A and B-B.

FIG. 10A is a plan view of a sealing portion, a first acoustic path, and a second acoustic path, according to an embodiment. FIG. 10B is a cross-sectional view of the sealing portion shown in FIG. 10A, taken along lines A-A and B-B.

Referring to FIGS. 10A and 10B, the connecting portion 53 according to an embodiment may include the first connection area 531 in which the first sealing area 5110 and the second sealing member 52 included in the first sealing member 51 are connected to each other and the second connection area 532 in which the second sealing area 5120 and the second sealing member 52 included in the first sealing member 51 are connected to each other.

The first connection area 531 may be formed to extend in a single direction to connect the first sealing area 5110 and the second sealing member 52 to each other. For example, the first connection area 531 is arranged in such a manner that both surfaces thereof are respectively in contact with the housing 30 and the rear case 60, and may perform sealing.

When the housing 30 and the rear case 60 are coupled to each other, the second connection area 532 may be a support capable of supporting the first sealing area 5110. For example, the second connection area 532 is arranged at both side portions of the second sealing area 5120 to support the first sealing area 5110 together with the second sealing area 5120.

For example, the second sealing area 5120 and the second connection area 532, which are arranged to face the first acoustic path 410, may be arranged in an arcuate shape. For example, the second sealing area 5120 may include a flat shaped cross-section, and the second connection area 532 extending from the second sealing area 5120 may include an inclined surface. As an area arranged to face the first acoustic path 410 is provided in an arcuate shape, characteristics of sound passing through the first acoustic path 410 may be improved.

Figure 11A:
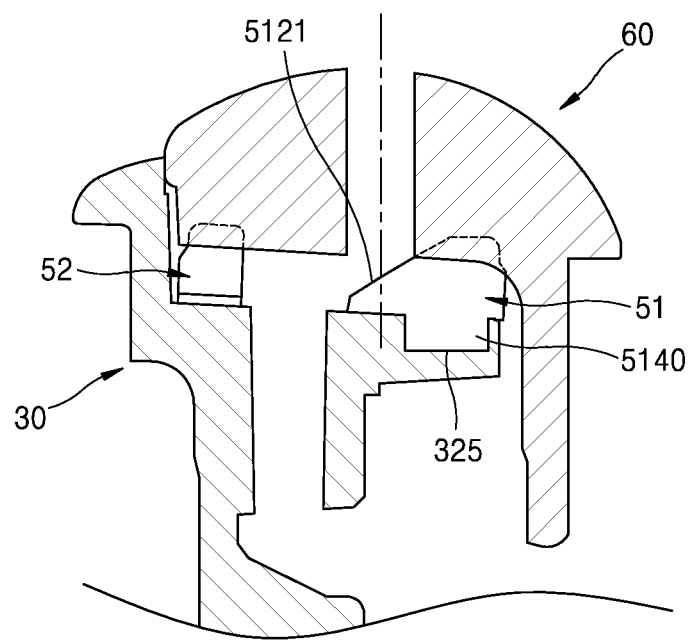
FIG. 11A is a cross-sectional view of a housing, a rear case, and a sealing portion, according to an embodiment.
Figure 11B:
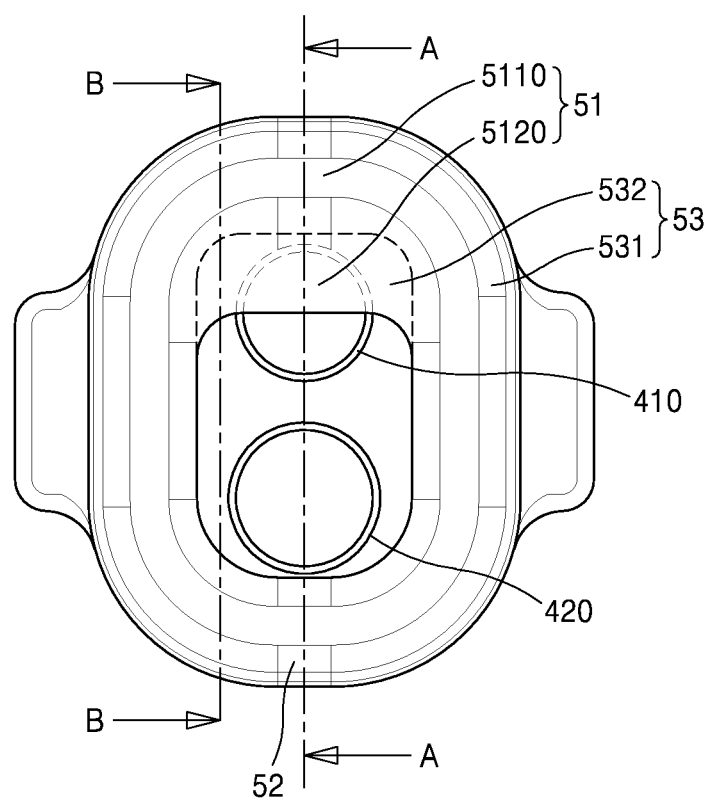
FIG. 11B is a plan view of a sealing portion, a first acoustic path, and a second acoustic path, according to an embodiment.
Figure 11C:
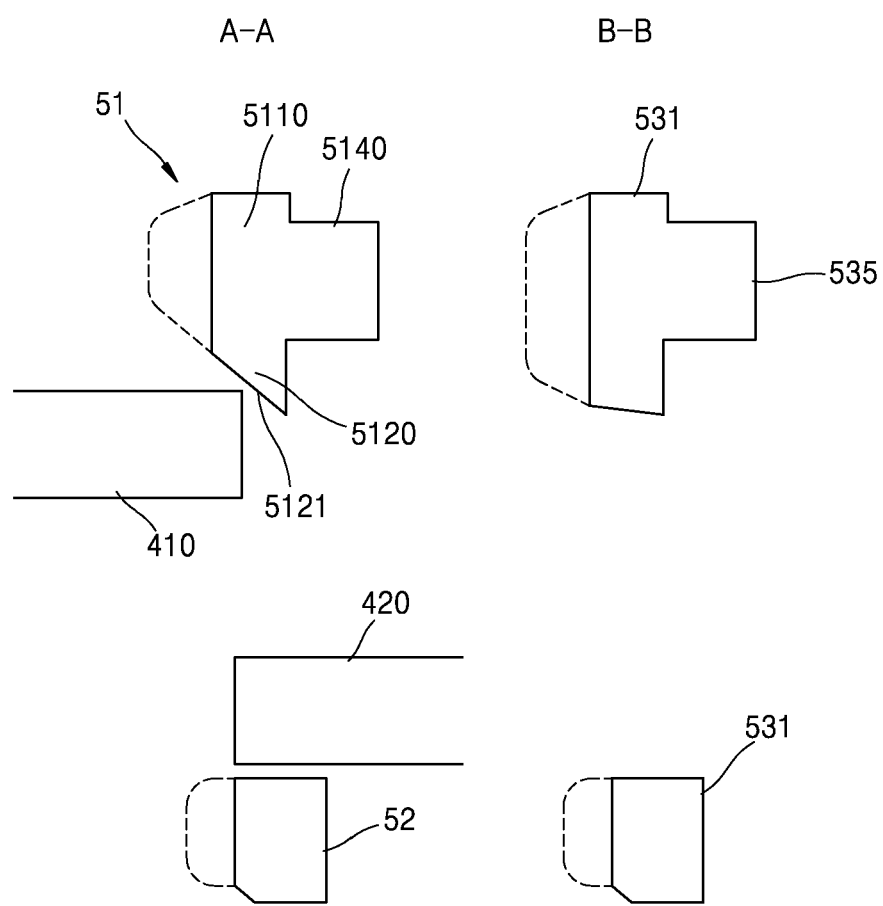
FIG. 11C is a cross-sectional view of the sealing portion shown in FIG. 11A, taken along lines A-A and B-B.
Figure 12A:
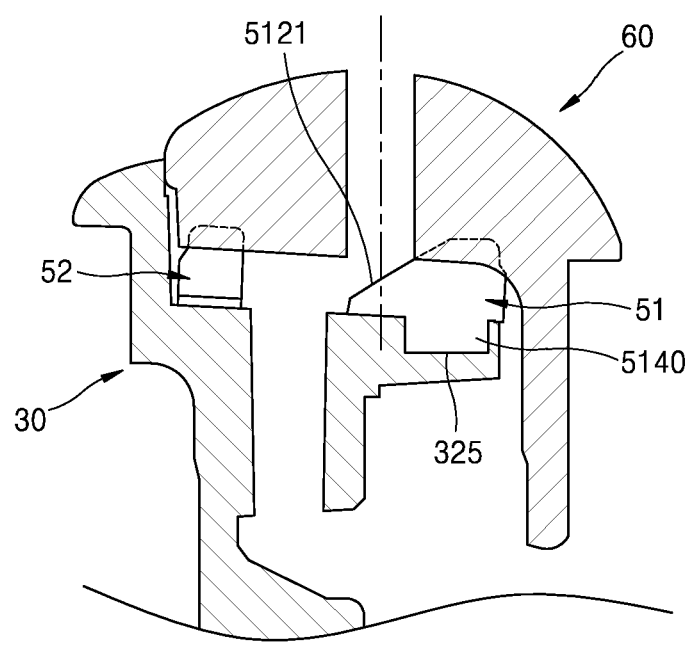
FIG. 12A is a cross-sectional view of a housing, a rear case, and a sealing portion, according to an embodiment.
Figure 12B:
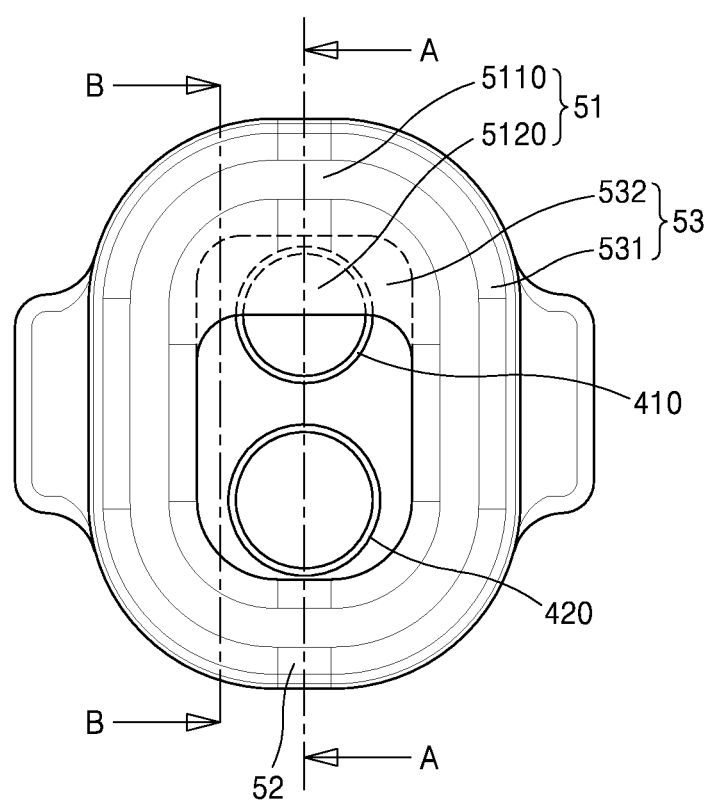
FIG. 12B is a plan view of a sealing portion, a first acoustic path, and a second acoustic path, according to an embodiment.
Figure 12C:
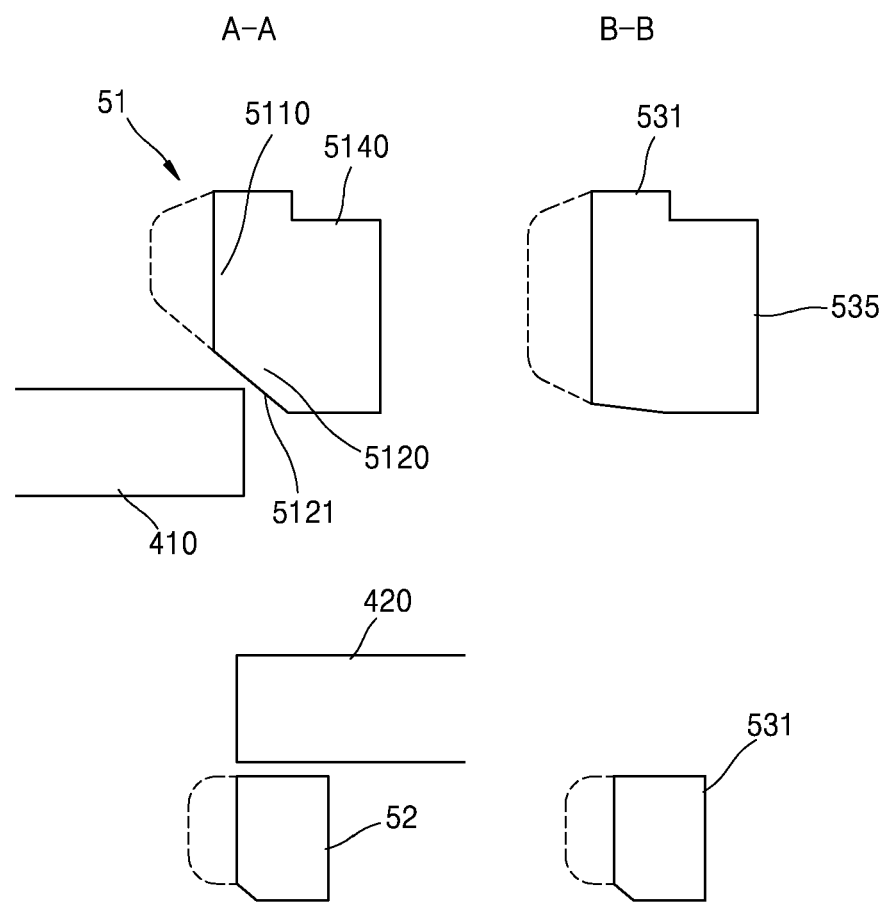
FIG. 12C is a cross-sectional view of the sealing portion shown in FIG. 12A, taken along lines A-A and B-B.

FIG. 11A is a cross-sectional view of a housing, a rear case, and a sealing portion, according to an embodiment. FIG. 11B is a plan view of a sealing portion, a first acoustic path, and a second acoustic path, according to an embodiment. FIG. 11C is a cross-sectional view of the sealing portion shown in FIG. 11A, taken along lines A-A and B-B. FIG. 12A is a cross-sectional view of a housing, a rear case, and a sealing portion, according to an embodiment. FIG. 12B is a plan view of a sealing portion, a first acoustic path, and a second acoustic path, according to an embodiment. FIG. 12C is a cross-sectional view of the sealing portion shown in FIG. 12A, taken along lines A-A and B-B.

Referring to FIGS. 11A to 11C, a first sealing member mounting groove 325 for mounting the first sealing member 51 may be arranged in the housing 30 according to an embodiment. In this case, a first sealing member mounting portion 5140 having a shape corresponding to the first sealing member mounting groove 325 may be arranged in the first sealing member 51. For example, when the housing 30 and the rear case 60 are coupled to each other, the first sealing member mounting portion 5140 may be inserted into and supported by the first sealing member mounting groove 325.

For example, in order to secure a higher bearing power, the first sealing member mounting groove 325 may extend to a lower portion of the inclined portion 5121 as shown in FIGS. 12A to 12C. In this case, the first sealing member mounting portion 5140 may be provided in a shape corresponding to the first sealing member mounting groove 325.

A connecting portion mounting groove (not shown) for mounting the connecting portion 53 may be arranged in the housing 30 according to an embodiment. For example, a connecting portion mounting portion (not shown) may be formed to extend from the first sealing member mounting groove 325. In this case, a connecting portion mounting portion 535 having a shape corresponding to the connecting portion mounting groove (not shown) may be arranged in the connecting portion 53. For example, when the housing 30 and the rear case 60 are coupled to each other, the connecting portion mounting portion 535 may be inserted into and supported by the connecting portion mounting portion (not shown).

Also, for example, the first sealing member mounting groove 325 may extend to a lower portion of the inclined portion 5121 as shown in FIGS. 12A to 12C to secure a higher bearing power. In this case, the first sealing member mounting portion 5140 may be provided in a shape corresponding to the first sealing member mounting groove 325.

The above embodiments are merely exemplary, and various modifications and equivalent other embodiments are possible by those of ordinary skill in the art. Accordingly, the true technical protection scope of the disclosure should be determined by the technical spirit of the disclosure described in the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing;
   a rear case coupled to the housing;
   a sealing member arranged between the housing and the rear case;
   a first acoustic path extending in a single direction and including an end portion arranged between the housing and the rear case;
   a first sealing member arranged between the housing and the rear case and including:
      a first sealing area having a first sealing surface in contact with the housing and a second sealing surface in contact with the rear case, and
      a second sealing area having a surface in contact with one of the housing and the rear case; and
   a second sealing member arranged between the housing and the rear case and having a first sealing surface in contact with the housing and a second sealing surface in contact with the rear case,
   wherein the second sealing area is arranged at the end portion of the first acoustic path and includes an inclined portion oriented at the end portion of the first acoustic path, and
   wherein the first sealing member and the second sealing member are arranged at different heights in a thickness direction of the electronic device.

2. The electronic device of claim 1, wherein the second sealing member and the first sealing member are sequentially arranged in a direction in which the housing moves to couple to the rear case.

3. The electronic device of claim 1, wherein the first sealing member and the second sealing member each include a flexible material.

4. The electronic device of claim 1, further comprising a connecting portion arranged to connect the first sealing member to the second sealing member.

5. The electronic device of claim 4, wherein the connecting portion includes:
   a first connection area in which the first sealing area is connected to the second sealing member, and
   a second connection area in which the second sealing area is connected to the second sealing member.

6. The electronic device of claim 5, wherein the second sealing area and the second connection area each include an arcuate shape oriented at the first acoustic path.

7. The electronic device of claim 4, wherein:
   the connecting portion includes a first connection area having a first surface in contact with the housing and a second surface in contact with the rear case, and
   the second sealing area protrudes from the first sealing area and the first connection area in the thickness direction of the electronic device.

8. The electronic device of claim 4, further comprising a connecting portion mounting groove arranged in one of the housing and the rear case,
   wherein the connecting portion includes a connecting portion mounting portion inserted into the connecting portion mounting groove.

9. The electronic device of claim 1, wherein a thickness of an overlapping area in which the first sealing area is in contact with one of the housing and the rear case is less than or equal to a distance between a lower end portion of the first acoustic path and an upper end portion of the overlapping area.

10. The electronic device of claim 1, further comprising a second acoustic path extending in a single direction and including an end portion arranged between the housing and the rear case,
    wherein the first acoustic path is arranged at a different height than the second acoustic path in the thickness direction of the electronic device.

11. The electronic device of claim 10, further comprising an acoustic chamber connecting the end portion of the second acoustic path to the end portion of the first acoustic path.

12. The electronic device of claim 11, wherein a width of the acoustic chamber in the single direction in which the first acoustic path extends is 25% or less than a diameter of the first acoustic path.

13. The electronic device of claim 1, further comprising a first sealing member mounting groove arranged in one of the housing and the rear case,
    wherein the first sealing member includes a first sealing member mounting portion inserted into the first sealing member mounting groove.

14. The electronic device of claim 13, wherein the first sealing member mounting groove may be arranged at a lower portion of the inclined portion.

15. The electronic device of claim 1, wherein the second sealing area includes a quadrangular shaped cross-section in the thickness direction of the electronic device.

16. The electronic device of claim 1, wherein the second sealing area includes a triangular shaped cross-section in the thickness direction of the electronic device.

17. The electronic device of claim 1, further comprising a display panel that display a screen.

18. The electronic device of claim 1, further comprising a first transparent member arranged in front of the housing.

19. The electronic device of claim 1, further comprising a second transparent member arranged at a rear of the rear case.

* * * * *